United States Patent
Adcock et al.

(10) Patent No.: US 12,246,697 B2
(45) Date of Patent: Mar. 11, 2025

(54) TORQUE DISTRIBUTION STRATEGIES FOR HYBRID VEHICLES

(71) Applicant: JAGUAR LAND ROVER LIMITED, Coventry (GB)

(72) Inventors: Lee Adcock, Hardwick (GB); David Copp, Coventry (GB); Christina O'Sullivan, Warwick (GB); Matt Sullivan, Hinkley (GB); Olivier Roques, Banbury (GB)

(73) Assignee: Jaguar Land Rover Limited, Coventry (GB)

( * ) Notice: Subject to any disclaimer, the term of this patent is extended or adjusted under 35 U.S.C. 154(b) by 204 days.

(21) Appl. No.: 17/920,758

(22) PCT Filed: Apr. 21, 2021

(86) PCT No.: PCT/EP2021/060451
§ 371 (c)(1),
(2) Date: Oct. 21, 2022

(87) PCT Pub. No.: WO2021/214182
PCT Pub. Date: Oct. 28, 2021

(65) Prior Publication Data
US 2023/0166715 A1  Jun. 1, 2023

(30) Foreign Application Priority Data
Apr. 21, 2020  (GB) .................................... 2005811

(51) Int. Cl.
*B60W 20/15*  (2016.01)
*B60W 10/06*  (2006.01)
(Continued)

(52) U.S. Cl.
CPC ............ *B60W 20/15* (2016.01); *B60W 10/06* (2013.01); *B60W 10/08* (2013.01); *B60W 30/02* (2013.01);
(Continued)

(58) Field of Classification Search
CPC ...... B60W 20/15; B60W 10/06; B60W 10/08; B60W 30/02; B60W 30/188;
(Continued)

(56) References Cited

U.S. PATENT DOCUMENTS 7,742,852 B1 *  6/2010  Tang ........................ B60T 8/175
                                                                701/22
11,007,880 B2 *  5/2021  Plianos ............... B60L 15/2009
(Continued)

FOREIGN PATENT DOCUMENTS

FR  3072068 A1  4/2019
GB  2571331 A   8/2019

OTHER PUBLICATIONS

Patents Act 1977: Combined Search and Examination Report under Sections 17 and 18(3) corresponding to Great Britain Application No. GB2005811.1, dated Sep. 3, 2020, 7 pages.
(Continued)

*Primary Examiner* — Mussa A Shaawat
(74) *Attorney, Agent, or Firm* — Reising Ethington P.C.

(57) ABSTRACT

Aspects of the present invention relate to a method and to a control system for a vehicle, the vehicle comprising an internal combustion engine configured to provide torque to a first axle of the vehicle for generating first axle wheel torque, and an electric machine configured to provide torque to a second axle of the vehicle for generating second axle wheel torque, the method comprising: outputting a torque request for the engine and a torque request for the electric machine, the torque requests having a first ratio dependent
(Continued)

on a required torque split between the first axle wheel torque and the second axle wheel torque, wherein received first axle wheel torque and received second axle wheel torque have a second variable ratio dependent on a difference between wheel torque response capabilities of the engine and of the electric machine; determining that a trigger condition is satisfied; and controlling, in dependence on satisfaction of the trigger condition, determination of the torque request for the electric machine such that deviation of the second ratio from the first ratio is inhibited.

18 Claims, 3 Drawing Sheets

(51) Int. Cl.
*B60W 10/08* (2006.01)
*B60W 30/02* (2012.01)
*B60W 30/188* (2012.01)

(52) U.S. Cl.
CPC ..... *B60W 30/188* (2013.01); *B60W 2520/105* (2013.01); *B60W 2520/125* (2013.01); *B60W 2520/26* (2013.01); *B60W 2555/00* (2020.02); *B60W 2710/0666* (2013.01); *B60W 2710/083* (2013.01)

(58) Field of Classification Search
CPC ..... B60W 2520/105; B60W 2520/125; B60W 2520/26; B60W 2555/00; B60W 2710/0666; B60W 2710/083; B60W 2520/263; B60W 2530/16; B60K 17/354; B60K 17/356

See application file for complete search history.

(56) References Cited

U.S. PATENT DOCUMENTS

| | | | | |
|---|---|---|---|---|
| 11,124,176 | B2* | 9/2021 | Plianos | B60K 17/356 |
| 11,472,411 | B2* | 10/2022 | Hancock | B60K 6/52 |
| 2004/0104699 | A1* | 6/2004 | Nishikawa | B60K 6/44 |
| | | | | 180/65.225 |
| 2004/0176899 | A1* | 9/2004 | Hallowell | B60L 15/2036 |
| | | | | 701/84 |
| 2010/0222953 | A1* | 9/2010 | Tang | B60L 15/20 |
| | | | | 701/22 |
| 2015/0006004 | A1* | 1/2015 | Yamamoto | B60K 6/445 |
| | | | | 903/902 |
| 2017/0137012 | A1* | 5/2017 | Mao | B60K 6/52 |
| 2017/0328461 | A1* | 11/2017 | Nasu | F16H 57/12 |
| 2018/0257477 | A1* | 9/2018 | Krueger | B60K 6/52 |
| 2018/0372200 | A1* | 12/2018 | Kumar | B60K 6/442 |
| 2019/0263413 | A1* | 8/2019 | Hancock | B60K 17/356 |
| 2021/0309204 | A1* | 10/2021 | Isami | B60W 10/08 |

OTHER PUBLICATIONS

International Search Report corresponding to International Application No. PCT/EP2021/060451, dated Jun. 29, 2021, 5 pages.
Written Opinion corresponding to International Application No. PCT/EP2021/060451, dated Jun. 29, 2021, 7 pages.

* cited by examiner

TORQUE DISTRIBUTION STRATEGIES FOR HYBRID VEHICLES

TECHNICAL FIELD

The present disclosure relates to torque distribution strategies for hybrid vehicles. In particular, but not exclusively it relates to torque distribution strategies for hybrid vehicles capable of all-wheel drive.

BACKGROUND

An all-wheel drive hybrid vehicle architecture may comprise an internal combustion engine associated with an engine-driven axle and an electrical machine associated with an electrically-driven axle.

When an internal combustion engine is suddenly requested to provide a large amount of torque, an initial torque increase can be rapidly provided by adjusting the spark timing and/or fuelling of the engine, after which the rate of torque increase will slow down due to the inertia of the current, slowly-changing air flow through the engine. This scenario may arise for example if a driver wishes to accelerate away quickly. This may result in the torque split between the two axles deviating from a desired ratio, which may adversely affect the handling or capability of the vehicle on some terrains.

SUMMARY OF THE INVENTION

It is an aim of the present invention to address one or more disadvantages associated with the prior art.

Aspects and embodiments of the invention provide a control system, a system, a vehicle, a method, and computer software as claimed in the appended claims.

According to an aspect of the invention there is provided a control system for controlling an electric machine of a vehicle, the vehicle comprising an internal combustion engine configured to provide torque to a first axle of the vehicle for generating first axle wheel torque, and the electric machine configured to provide torque to a second axle of the vehicle for generating second axle wheel torque, the control system comprising one or more controllers, wherein the control system is configured to: output a torque request for the engine and a torque request for the electric machine, the torque requests having a first ratio dependent on a required torque split between the first axle wheel torque and the second axle wheel torque, wherein received first axle wheel torque and received second axle wheel torque have a second variable ratio dependent on a difference between wheel torque response capabilities of the engine and of the electric machine; determine that a trigger condition is satisfied; and control, in dependence on satisfaction of the trigger condition, determination of the torque request for the electric machine such that deviation of the second ratio from the first ratio is inhibited.

An advantage is improved consistency of vehicle handling characteristics.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to perform the outputting of the torque requests, the determining, and the controlThe trigger condition may be a low traction trigger condition, wherein satisfaction of the low traction trigger condition is dependent on a change of terrain for the vehicle, to a terrain associated with a low traction driving surface.

In response to the determination of a change of terrain for the vehicle, the inhibited deviation control may be maintained until a subsequent determination of a change of terrain for the vehicle, to a terrain not associated with a low traction driving surface.

Determining a change of terrain may comprise determining the characteristics and/or type of surface that the vehicle is currently being driven on.

Determining a change of terrain may comprise receiving at least one input from a user of the vehicle selecting a terrain mode of the vehicle.

Satisfaction of the trigger condition may be dependent on detection of wheel slip.

In response to the detection of wheel slip, the inhibited deviation control may be maintained until satisfaction of an exit condition associated with the wheel slip no longer being detected.

The torque request for the electric machine and the torque request for the internal combustion engine, may be dependent on a vehicle torque request, so that the electric machine provides torque to the second axle while the internal combustion engine provides torque to the first axle.

The required torque split may be dependent on at least one of: vehicle speed; vehicle steering; lateral acceleration; or longitudinal acceleration.

The inhibited deviation control may be performed in dependence on the trigger condition and in dependence on an indication of deviation of the first ratio from the second ratio.

The inhibited deviation may be controlled using a constraint limiting torque requestable from the electric machine.

The inhibited deviation control may be configured to reduce the torque request for the electric machine, so that the electric machine is permitted to change its provided torque at a slower rate than the electric machine is capable of, based on a rate at which the internal combustion engine changes its torque.

The reducing of the torque request for the electric machine may be dependent on an engine torque constraint dependent on detected or estimated combustion engine torque, wherein the combustion engine torque is dependent on torque providable by the engine in response to the torque request for the engine.

The control system may be configured to: receive an indication of a shortfall between combustion engine torque and the torque request for the engine; and control the determination of the torque request for the electric machine to cause the electric machine to provide compensation torque to the second axle, wherein the compensation torque is configured to compensate for the shortfall but causes the second variable ratio to deviate from the first ratio, wherein when the trigger condition is satisfied, the inhibited deviation control inhibits the provision of the compensation torque to the second axle, such that deviation of the second ratio from the first ratio is inhibited.

According to an aspect of the invention there is provided a system comprising the control system, the electric machine and the internal combustion engine.

According to an aspect of the invention there is provided a vehicle comprising the system.

In some examples, the vehicle is configured to mechanically provide torque from the internal combustion engine to the first axle and from the first electric machine to the second axle, but is not capable of mechanically providing torque from the internal combustion engine to the second axle and is not capable of mechanically providing torque from the first electric machine to the first axle.

According to an aspect of the invention there is provided a method of controlling an electric machine of a vehicle, the vehicle comprising an internal combustion engine configured to provide torque to a first axle of the vehicle for generating first axle wheel torque, and the electric machine configured to provide torque to a second axle of the vehicle for generating second axle wheel torque, the method comprising: outputting a torque request for the engine and a torque request for the electric machine, the torque requests having a first ratio dependent on a required torque split between the first axle wheel torque and the second axle wheel torque, wherein received first axle wheel torque and received second axle wheel torque have a second variable ratio dependent on a difference between wheel torque response capabilities of the engine and of the electric machine; determining that a trigger condition is satisfied; and controlling, in dependence on satisfaction of the trigger condition, determination of the torque request for the electric machine such that deviation of the second ratio from the first ratio is inhibited.

According to an aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

According to an aspect of the invention there is provided a method of controlling an electric machine of a vehicle, the vehicle comprising an internal combustion engine configured to provide torque to a first axle of the vehicle for generating first axle wheel torque, and the electric machine configured to provide torque to a second axle of the vehicle for generating second axle wheel torque, the method comprising: outputting a torque request for the internal combustion engine and a torque request for the electric machine, in dependence on a vehicle torque request, the torque requests having a ratio dependent on a required torque split between the first axle wheel torque and the second axle wheel torque, wherein received first axle wheel torque and received second axle wheel torque have a second variable ratio dependent on a difference between wheel torque response capabilities of the engine and of the electric machine, wherein the second ratio is permitted to vary; determining that a trigger condition is satisfied; and in dependence on satisfaction of the trigger condition, reducing the torque request for the electric machine to maintain the required torque split, so that the electric machine is permitted to change its provided torque at a slower rate than the electric machine is capable of, based on a rate at which the internal combustion engine is able to change its provided torque.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
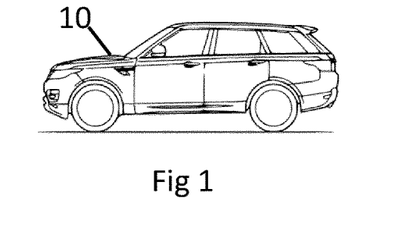
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 comprises a plurality of torque sources. A torque source refers to a prime mover, such as an engine, an electric machine, or the like. The vehicle comprises a first torque source configured to provide torque to a first axle of the vehicle for generating first axle wheel torque. The vehicle further comprises a second torque source configured to provide torque to a second axle of the vehicle for generating second axle wheel torque.

The torque sources are different torque sources having different wheel torque response capabilities. A wheel torque response capability, or 'torque rate capability', defines a maximum rate at which the torque source can change its torque as measured at the vehicle wheels. The wheel torque response capability of a torque source depends on its machine torque response capability and on a selected gear reduction to the wheels. The gearing and the machine torque response capabilities may differ between the torque sources.

The machine torque response capability rate could depend on either a hardware-limited physical limit of the maximum rate of torque change, or a lower allowable limit. A machine torque response capability depends on variables such as an operating point of the torque source, such as its speed. An engine torque response capability tends to rise from a low value at low engine speeds, reaches a plateau, and then falls at high speeds. An electric machine torque response capability tends to be maximum at zero machine speed, followed by a plateau then a fall.

In some examples, one of the torque sources may comprise an engine and the other torque source may comprise an electric machine. An engine may have a slower torque response capability than an electric machine over some or all operating points.

Alternatively, both torque sources may comprise electric machines having different wheel torque response capabilities because the machine torque response capabilities are different, and/or because there is a different gear ratio between the torque source and the wheel.

The vehicle 10 may be a hybrid electric vehicle (HEV). The vehicle 10 may be configured to operate as a parallel HEV. Parallel HEVs comprise a torque path between the engine and at least one vehicle wheel, as well as a torque path between an electric machine and at least one vehicle wheel. The torque path(s) may be disconnectable by a torque path connector such as a clutch or transmission. Typically, parallel HEVs differ from series HEVs, because in series HEVs the purpose of the engine is to generate electrical energy and there is no torque path between the engine and vehicle wheels. However, some types of parallel HEVs may be configurable to operate as a series HEV, such as 'through-the-road' hybrids. In this case we may usefully describe such a hybrid vehicle as operating in a parallel HEV mode or in a series HEV mode, depending on whether torque is being delivered from the engine directly to the vehicle wheels.

Figure 2:
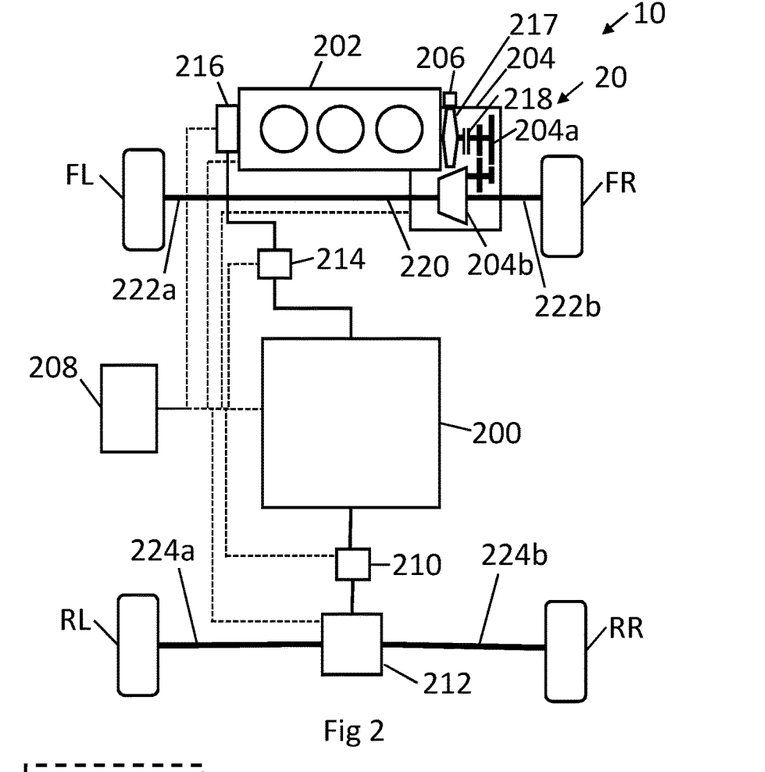
FIG. 2 illustrates an example of a system.

FIG. 2 illustrates an example system 20 for an HEV 10. The system 20 defines, at least in part, a powertrain of the HEV.

The system 20 comprises a control system 208. The control system 208 comprises one or more controllers. The control system 208 may comprise one or more of: a hybrid powertrain control module; an engine control unit; a transmission control unit; a traction battery management system; and/or the like.

The system 20 comprises one or more torque sources. A torque source refers to a prime mover, such as an engine, an electric machine, or the like. An electric machine is also referred to herein as an electric machine. The illustrated system 20 comprises an engine 202. The engine 202 is an internal combustion engine (ICE). The illustrated engine 202 comprises three combustion chambers, however a different number of combustion chambers may be provided in other examples.

The engine 202 is operably coupled to the control system 208 to enable the control system 208 to control output torque of the engine 202. The output torque of the engine 202 may be controlled by controlling one or more of: air-fuel ratio; spark timing; poppet valve lift; poppet valve timing; throttle opening position; fuel pressure; turbocharger boost pressure; and/or the like, depending on the type of engine 202.

The system 20 comprises a transmission 204 for receiving output torque from the engine 202. The transmission 204 may comprise an automatic vehicle transmission, a manual vehicle transmission, or a semi-automatic vehicle transmission. The transmission 204 may comprise one or more torque path connectors 218, a torque converter 217, and a gear train 204a. The gear train 204a is configured to provide a selected gear reduction in accordance with a selected gear of the vehicle 10. The gear train 204a may comprise five or more different selectable gear reductions. The gear train 204a may comprise at least one reverse gear and a neutral gear.

The system 20 may comprise a differential 204b which is a second gear train for receiving output torque from the gear train 204a. The differential 204b may be integrated into the transmission 204 as a transaxle, or provided separately.

The engine 202 is mechanically connected (coupled) or connectable (couplable) to provide positive torque to a first set of vehicle wheels (FL, FR) via a torque path 220. The torque path 220 extends from an output of the engine 202 to the transmission 204, then and then to first set of vehicle wheels (FL, FR) via a first axle or axles 222a, 222b. In a vehicle overrun and/or friction braking situation, negative torque may flow from the first set of vehicle wheels (FL, FR) to the engine 202.

The illustrated first set of vehicle wheels (FL, FR) comprises front wheels, and the axles 222a, 222b are front transverse axles. Therefore, the system 20 is configured for front wheel drive by the engine 202. In another example, the first set of vehicle wheels comprises rear wheels (RL, RR). The illustrated first set of vehicle wheels (FL, FR) is a pair of vehicle wheels, however a different number of vehicle wheels and axles could be provided in other examples.

In the illustrated system 20, no longitudinal (centre) driveshaft is provided, to make room for hybrid vehicle components. Therefore, the engine 202 is not connectable to a second set of rear wheels (rear wheels RL, RR in the illustration). The engine 202 may be transverse mounted to save space. In an alternative example, the engine 202 may be configured to drive the front and rear wheels.

A torque path connector 218 may be provided inside and/or outside a bell housing of the transmission 204. The torque path connector 218 is configured to connect and configured to disconnect the torque path 220 between the engine 202 and the first set of vehicle wheels (FL, FR). The torque path connector 218 may be a part of the torque converter 217 or gear train 204a, or may be a separate friction clutch. The system 20 may be configured to automatically actuate the torque path connector 218 without user intervention.

The system 20 comprises a first electric machine 216. The first electric machine 216 may be an alternating current induction motor or a permanent magnet motor, or another type of motor. The first electric machine 216 is located so that when the torque path 220 is disconnected from the first set of vehicle wheels (FL, FR), the first electric machine 216 is also disconnected. Alternatively, the first electric machine 216 may be located so that it remains connected to the first set of vehicle wheels (FL, FR).

The first electric machine 216 may be mechanically connected (coupled) or connectable (couplable) to the engine 202 via a belt or chain. For example, the first electric machine 216 may be a belt integrated starter generator (BISG). The first electric machine 216 and the engine 202 together form a torque source for the first set of vehicle wheels (FL, FR). In the illustration, the first electric machine 216 is located at an accessory drive end of the engine 202, opposite a vehicle transmission end of the engine 202. In an alternative example, the first electric machine 216 is a crankshaft integrated motor generator (CI MG), located at a vehicle transmission end of the engine 202. A CIMG may be capable of sustained electric-only driving unlike typical BISGs.

The first electric machine 216 is configured to apply positive torque and configured to apply negative torque to a crankshaft of the engine 202, for example to provide functions such as: boosting output torque of the engine 202; deactivating (shutting off) the engine 202 while at a stop or coasting; activating (starting) the engine 202; generating power for ancillary loads; and/or regenerative braking in a regeneration mode. In a parallel HEV mode, the engine 202 and first electric machine 216 may both be operable to supply positive torque simultaneously to boost output torque. The first electric machine 216 may be incapable of sustained electric-only driving. In an alternative example, the first electric machine 216 is not controllable to provide positive torque other than to start the engine 202. In further examples, a pinion starter 206 is provided for starting the engine 202.

FIG. 2 illustrates a second electric machine 212, also referred to as an electric traction motor, configured to enable at least an electric vehicle mode comprising electric-only driving. Another term for the second electric machine 212 is an electric drive unit. In some, but not necessarily all examples, a nominal maximum torque of the second electric machine 212 is greater than a nominal maximum torque of the first electric machine 216.

Even if the torque path 220 between the engine 202 and the first set of vehicle wheels (FL, FR) is disconnected, the vehicle 10 can be driven in electric vehicle mode because the second electric machine 212 is mechanically connected to at least one vehicle wheel.

The illustrated second electric machine 212 is configured to provide torque to the illustrated second set of vehicle wheels (RL, RR). The second set of vehicle wheels (RL, RR) comprises vehicle wheels not from the first set of vehicle wheels (FL, FR). The illustrated second set of vehicle wheels (RL, RR) comprises rear wheels, and the second electric machine 212 is operable to provide torque to the rear wheels RL, RR via a second, rear transverse axle or axles 224a, 224b. Therefore, the illustrated vehicle 10 is rear wheel driven in electric vehicle mode. In an alternative example, the second set of vehicle wheels comprises at least one vehicle wheel of the first set of vehicle wheels. In a further alternative implementation, the second electric machine 212 is replaced with two electric machines, one for each rear vehicle wheel RL, RR.

The control system 208 may be configured to disconnect the torque path 220 between the engine 202 and the first set of vehicle wheels (FL, FR) in electric vehicle mode, to reduce parasitic pumping energy losses. For example, the clutch 218 may be opened. In the example of FIG. 2, this means that the first electric machine 216 will also be disconnected from the first set of vehicle wheels (FL, FR).

Another benefit of the second electric machine 212 is that the second electric machine 212 may also be configured to be operable in a parallel HEV mode, to enable multi-axle drive (e.g. all-wheel drive) operation despite the absence of a centre driveshaft.

In order to store electrical energy for the electric machines, the system 20 comprises an electrical energy storage means such as a traction battery 200. The traction battery 200 provides a nominal voltage required by electrical power users such as the electric machines.

The traction battery 200 may be a high voltage battery. High voltage traction batteries provide nominal voltages in the hundreds of volts. The traction battery 200 may have a voltage and capacity to support electric only driving for sustained distances. The traction battery 200 may have a capacity of several kilowatt-hours, to maximise range. The capacity may be in the tens of kilowatt-hours, or even over a hundred kilowatt-hours.

Although the traction battery 200 is illustrated as one entity, the function of the traction battery 200 could be implemented using a plurality of small traction batteries in different locations on the vehicle 10.

The first electric machine 216 and second electric machine 212 may be configured to receive electrical energy from the same traction battery 200 as shown.

Finally, the illustrated system 20 comprises inverters. Two inverters 210, 214 are shown, one for each electric machine. In other examples, one inverter or more than two inverters could be provided.

In an alternative implementation, the vehicle 10 may be other than shown in FIG. 2. For example, the first electric machine 216 may be connected through a clutch or gear to the engine 202, or may be located at the opposite end of the engine, possibly within the transmission 204 or on a driveshaft.

Figure 3A:
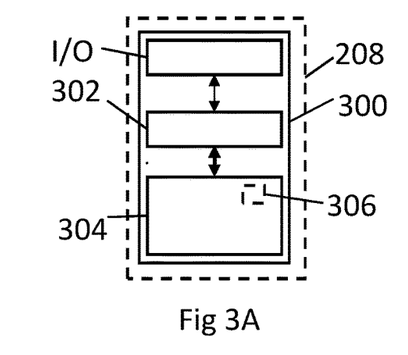
FIGS. 3A, 3B illustrate an example of a control system and of a non-transitory computer-readable storage medium.

FIG. 3A illustrates how the control system 208 may be implemented. The control system 208 of FIG. 3A illustrates a controller 300. In other examples, the control system 208 may comprise a plurality of controllers on-board and/or off-board the vehicle 10.

The controller 300 of FIG. 3A includes at least one processor 302; and at least one memory device 304 electrically coupled to the electronic processor 302 and having instructions 306 (e.g. a computer program) stored therein, the at least one memory device 304 and the instructions 306 configured to, with the at least one processor 302, cause any one or more of the methods described herein to be performed. The processor 302 may have an electrical input/output I/O or electrical input for receiving information and interacting with external components.

Figure 3B:
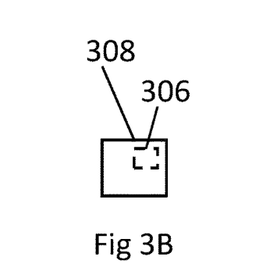

FIG. 3B illustrates a non-transitory computer-readable storage medium 308 comprising the instructions 306 (computer software).

The control system 208 may be configured to provide controller outputs to control output torque manipulate a variable (e.g. torque/speed) towards a setpoint. An example setpoint is a torque target or a speed target.

Output torque may be manipulated to satisfy at least one received torque request. A torque request may be a load-based torque request for the vehicle 10. This type of torque request may be referred to as a vehicle torque request or a total torque request for the whole vehicle, and is not specific to any particular torque source. The total torque request may be for a torque at the vehicle wheels. A load may be based on a driver torque demand (e.g. torque setpoint based on accelerator pedal depression APD), or autonomous driving torque demand, and/or dependent on a speed setpoint such as a cruise control speed setpoint.

Arbitration functions may be applied to change/increase the total torque request to satisfy a plurality of torque requests including load and requests from other vehicle subsystems. A shaping function may smooth the arbitrated total torque request.

The control system 208 may derive, from the shaped arbitrated total torque request, an engine torque request for controlling output torque of the engine, and/or an electric machine torque request(s) for controlling output torque of an electric machine or each electric machine, depending on a vehicle operating mode of the vehicle 10. A required torque split distribution function may control the derivation of the engine torque request and the electric machine torque request, wherein the electric machine is the second electric machine 212.

The required torque split may be a ratio. The torque split in this example is a front:rear torque split, between torque at the front and rear axles. The required torque split helps to maintain all-wheel drive balance of the vehicle 10 (front-biased, rear-biased, or 50:50). In some examples, the required torque split may vary dynamically. The required torque split may depend on variables such as vehicle speed; vehicle steering; lateral acceleration; and/or longitudinal acceleration. The required torque split may depend on variables such as: a driving dynamics mode; a terrain mode and/or a terrain type; vehicle speed; vehicle steering; lateral acceleration; and/or longitudinal acceleration; and/or other factors.

Shaping functions may be applied to smooth the engine and electric machine torque requests around a zero-crossing point (lash crossing), resulting in shaped engine and electric machine torque requests.

A system 20 such as the powertrain of FIG. 2 can be operated in a plurality of vehicle operating modes. In one or more vehicle operating modes, the engine 202 is deactivated and the torque path 220 between the engine 202 and the first set of vehicle wheels (FL, FR) is disconnected. In another one or more modes, the engine 202 is re-activated and the torque path 220 may be re-connected.

In electric vehicle mode, the engine 202 is in a deactivated state and the torque path 220 between the first set of vehicle wheels (FL, FR) and the engine 202 is disconnected. In an example, the effect of the combined deactivation and disconnection is that engine speed falls towards zero. Deactivation relates to the engine 202 producing no positive output torque or insufficient positive output torque for driving. Fuel injection may cease, to reduce fuel consumption.

In series HEV mode, the engine 202 is in an activated state but the torque path 220 is disconnected. The engine 202 and the first electric machine 216 generate electrical power, and the second electric machine 212 provides torque to the second set of vehicle wheels (RL, RR). One or both of the electric machines 212, 216 provides torque to vehicle wheels. If the second electric machine 212 is used, all-wheel drive is available.

In parallel HEV mode, the engine 202 is in an activated state and the torque path 220 is connected. In the activated state, fuel is combusted in the engine's combustion chambers, causing the engine 202 to provide positive output torque to the torque path 220. The engine 202 and the first electric machine 216 may optionally generate electrical power.

In an internal combustion engine mode, the engine 202 is in an activated state and the torque path 220 is connected. However, the first and second electric machines 212, 216 are not operable as motors to provide torque to the vehicle wheels. The engine 202 and the first electric machine 216 may optionally generate electrical power. The second electric machine 212 may optionally generate electrical power.

The vehicle operating mode may be selectable manually, semi-automatically, or automatically. A transition condition for changing to a vehicle operating mode that allows more charging than a current mode (e.g. exit electric vehicle mode) may require at least one of: a manual user selection; a traction battery state of charge falling below a threshold; a temperature being below a threshold (e.g. freezing weather); a change of driving dynamics mode; a change of terrain mode; an increase in power consumption due to a high load ancillary device being required to operate, such as an air conditioner unit or a heated windscreen; and/or the like.

A transition condition for changing to a vehicle operating mode that allows more net torque than a current mode and/or all-wheel drive (e.g. parallel HEV mode) may require at least one of: a manual user selection; a torque request rising above a threshold (e.g. kickdown function); a change of driving dynamics mode; a change of terrain mode; and/or the like.

A transition condition for changing to a vehicle operating mode that allows more electric driving than a current mode (e.g. one of the HEV modes or electric vehicle mode) may require at least one of: a manual user selection; a traction battery state of charge rising above a threshold; torque request falling below a threshold; a temperature being above a threshold; a change of driving dynamics mode; a change of terrain mode; and/or the like.

A driving dynamics mode refers to a mode that configures one or more of: a suspension setting; a throttle response setting; a gear shift point setting; a vehicle braking or traction control setting; a torque distribution setting; a torque shaping setting; a steering weighting setting; and/or the like.

A terrain mode generally refers to vehicle modes optimized for driving over particular driving surfaces. An example of a terrain mode is an off-road terrain mode, arranged to optimize the vehicle for driving over off-road terrain such as may be required when traversing areas of grass, gravel, sand, mud or even crawling over rocks. Another example of a terrain mode is a surface vehicle optimization mode, arranged to optimize the vehicle for driving over low friction surfaces such as snow or ice covered surfaces, either on or off road. A vehicle may comprise a base on-road mode and/or a base surface vehicle optimization mode for regular surfaces, and may comprise a plurality of terrain modes for various surfaces and/or terrain.

A terrain mode and/or detection of a particular terrain type may configure one or more surface traction-related settings such as a differential locking setting and/or a traction control setting. Additionally, or alternatively, other settings could be adjusted such as: a suspension setting; a ride height setting; a suspension damper setting; a throttle response setting; a gear shift point setting; a vehicle braking or traction control setting; a torque distribution setting; a torque shaping setting; or a steering weighting setting; and/or the like. There may be overlap between driving dynamics modes and terrain modes. The settings may be predetermined or configurable.

A manual user selection may comprise use of a human-machine interface input device. The input device may comprise an engine start button. The input device may comprise a driving dynamics mode selector. The input device may comprise a terrain mode selector. In some examples, a terrain mode and/or driving dynamics mode may be changeable automatically.

Figure 4:
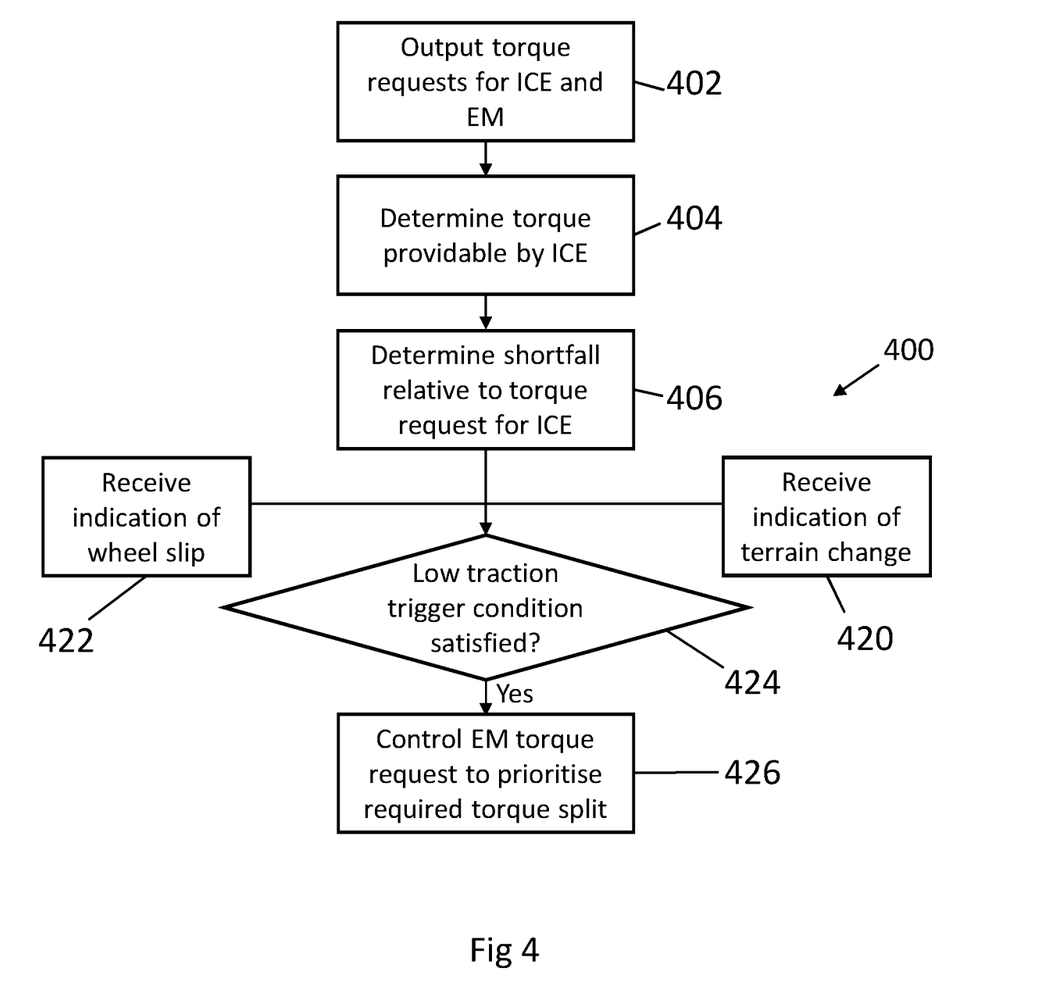
FIG. 4 illustrates an example of a method.

In accordance with an aspect of the invention, and as shown in FIG. 4, there is provided a computer-implemented method 400 for a vehicle 10, the method 400 comprising at least:

outputting a torque request for the engine 202 and a torque request for the electric machine 212, the torque requests having a first ratio dependent on a required torque split between the first axle wheel torque and the second axle wheel torque, wherein received first axle wheel torque and received second axle wheel torque have a second variable ratio dependent on a difference between wheel torque response capabilities of the engine 202 and of the electric machine 212 (block 402);

determining that a trigger condition is satisfied (block 424); and controlling, in dependence on satisfaction of the trigger condition, determination of the torque request for the electric machine such that deviation of the second ratio from the first ratio is inhibited (block 426).

There are various reasons why the second ratio may be allowed to deviate from the first ratio during normal operation. For example, after the individual torque requests have been determined according to the required torque split and selected gear reductions, torque shaping functions may be applied to the individual torque requests which can cause deviation. For example, a torque shaping function may reduce the allowable torque rate of change of a torque source around a zero-crossing point, for lash crossing protection. This would reduce the responsiveness of the torque source and cause a brief deviation from the required torque split. Further, deviation from the required torque split can occur if the second electric machine 212 is allowed to increase its torque at a higher rate than the engine 202 is capable of, in response to a vehicle torque request. Further, deviation can occur if the control system 208 comprises a compensation torque function that allows one torque source to provide extra torque in order to compensate for a detected torque shortfall of torque from the other torque source relative to the torque request of the other torque source. The amount of compensation torque may be proportional to the amount of shortfall. The provision of a compensation torque by one torque source as a consequence of a shortfall in torque from the other torque source will lead to a greater deviation from the required torque split, but ensures the total required torque is delivered. However, when the trigger condition is satisfied, compliance with the required torque split is given a higher priority.

At block 402 of FIG. 4, the method 400 comprises outputting the torque requests for the engine 202 and for the second electric machine 212. The torque requests may comprise the engine torque request (ICE torque request) and the electric machine torque request as defined above. The engine torque request and the electric machine torque request have a first ratio dependent on a required torque split between the first axle wheel torque and the second axle wheel torque. The requests may be derived from a received vehicle (total) torque request. If the vehicle 10 is in the parallel HEV mode, both an engine torque request and an electric machine torque request are derived from the vehicle torque request.

Figure 5A:
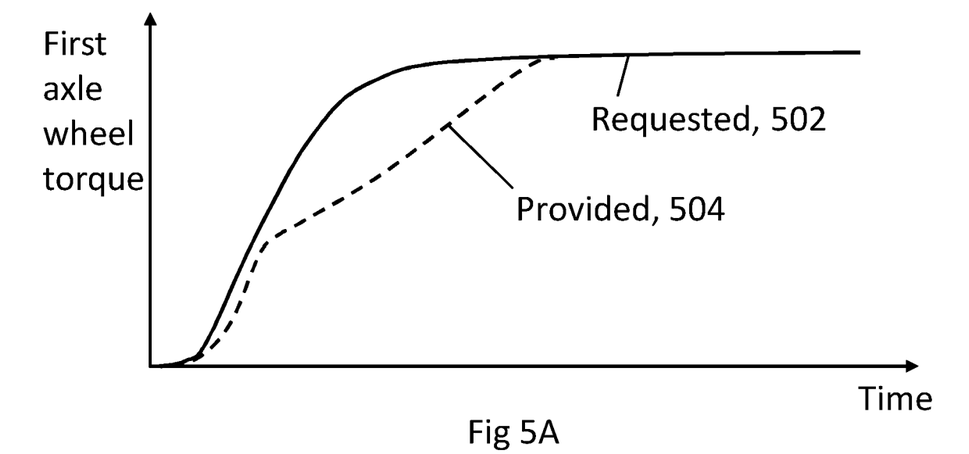
FIGS. 5A, 5B illustrate example graphs of torque of an engine and of an electric machine, respectively.
Figure 5B:
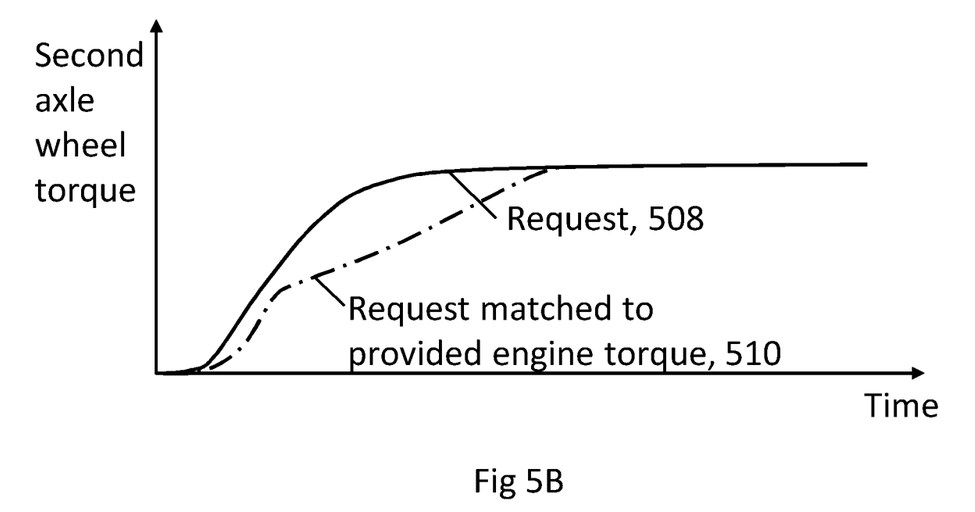

In an example use case, the torque requests are rising as shown by lines 502 and 508 of FIGS. 5A and 5B, for accelerating the vehicle or maintaining speed on an increasing slope. If FIGS. 5A and 5B are read in context of the example vehicle 10 of FIG. 2, it would be understood that FIG. 5A relates to front-wheel torque and FIG. 5B relates to rear-wheel torque. The engine torque request is shown by the solid line 502. The engine torque request increases at a high rate. The solid line 508 of FIG. 5B shows the electric machine torque request. In some examples, the method 400 may further apply to vehicle deceleration and the torque request may have an increasing negative value.

Block 404 of the method 400 comprises determining or estimating a torque parameter dependent on torque providable by the engine 202 in response to the engine torque request.

Due to variable real-world conditions such as air density, constraints such as fuel injection restrictions, torque shaping, and several other factors, the output torque provided by the engine 202 may lag behind movement of the torque request. The amount of lag (shortfall) depends on the variable conditions. This results in inconsistent acceleration for a given vehicle torque request. FIG. 5A illustrates an example of the first axle wheel torque, indicating torque requested and receivable at the first set of vehicle wheels (FL, FR) based on the engine torque request 502. The dashed line 504 represents torque providable by the engine 202. The engine 202 is initially highly responsive by advancing spark timing and/or fuelling, so the shortfall between lines 502 and 504 is negligible. However, once engine torque cannot be further increased by the above fast methods, the response of the engine 202 is slowed, primarily due to the inertia of the airflow through the engine 202. Therefore, the shortfall increases and results in a deviation from the required torque split, and may be perceived as sluggish acceleration by the vehicle driver.

To implement block 404, known torque sensing techniques may be applied. This determination may be implemented as feedback which determines the ICE torque provided in response to controlling the engine 202 based on the engine torque request. However, depending on the control system architecture and communication network latency for sensor-derived signals, it may be faster or more efficient to instead determine the torque parameter by estimating an expected value of the torque parameter in advance, based on a controller model of the providable torque of the engine 202.

Block 406 of the method 400 comprises determining the shortfall (difference) in torque providable by the engine relative to the engine torque request. For example, block 406 may comprise determining the difference between the torque parameter and the engine torque request. In some examples, the shortfall may be a wheel torque shortfall, expressed from the perspective of the first set of vehicle wheels (FL, FR) by accounting for gearing. A nonzero shortfall indicates that the engine 202 may not be performing according to its steady state capability. A nonzero shortfall results in the ratio of torques received at the vehicle wheels deviating from the ratio of torques requested at the vehicle wheels. This deviation in ratio of torques requested corresponds to a deviation in the required torque split. The consequence of the shortfall in torque providable (504) by the engine 202 is that the handling characteristics and/or traction performance of the vehicle 10 may be temporarily affected due to the deviation from the required torque split.

The method 400 therefore proceeds to the next set of operations, which comprise determining if a trigger condition is satisfied and controlling at least the second electric machine 212 to inhibit the torque output of the electric machine in response to the electric machine torque request in dependence on that determination.

At block 424 the method determines if a trigger condition is satisfied. First, the trigger condition is described.

In some examples, the trigger condition may be a low traction trigger condition. This is because vehicle oversteer or understeer is more likely to occur on low traction surfaces, so consistent vehicle handling is important. A low traction surface is a surface which affords only reduced levels of tractive force between a vehicle tyre and the terrain over which the vehicle is moving, and may otherwise be termed a low friction surface.

An example of a low traction trigger condition relates to low traction driving surface. In an implementation, satisfaction of the low traction trigger condition may be dependent on a change of terrain for the vehicle 10, to a terrain associated with a low traction driving surface.

For example, at block 420 of the method comprises receiving an indication of a change of terrain for the vehicle 10. Block 424 may comprise determining the change of terrain in dependence on the indication, and determining whether the trigger condition is satisfied in dependence on the change of terrain.

In some, but not necessarily all examples, determining that the change of terrain is to a terrain associated with a low traction driving surface may comprise determining a change of terrain mode of the vehicle 10, to a terrain mode associated with a low traction driving surface.

Some terrain modes are associated with low traction driving surfaces, and others are not. Terrain modes associated with low traction driving surfaces include, for example, a grass/gravel/snow terrain mode, a sand terrain mode, a rocky terrain mode, and/or wading. A low traction driving surface may not be determined if the terrain mode is a default and/or associated with a paved road. In some examples, determining a change of terrain mode comprises receiving at least one input from a user of the vehicle 10 selecting a terrain mode of the vehicle 10.

In some, but not necessarily all examples, determining that the change of terrain is to a terrain associated with a low traction driving surface may comprise determining the characteristics and/or type of surface (terrain type) that the vehicle 10 is currently being driven on. The terrain type may be determined automatically or selected manually. Determining a terrain type automatically may comprise receiving information indicative of a driving surface from a sensor. The sensor may comprise a camera, a water depth sensor, a radar sensor (radio detection and ranging) or a lidar sensor (light detection and ranging). The information may be indicative of driving surface friction. Examples of terrain types associated with low traction driving surfaces include: a grass/gravel/snow terrain type, a sand terrain type, a rocky terrain type, and/or wading. A low traction driving surface may not be determined if the terrain type is a default or a paved road.

The terrain mode and/or terrain type associated with a low traction driving surface may require all-wheel drive. The all-wheel drive may remain engaged until the terrain type and/or mode changes and no longer requires all-wheel drive.

In some examples, the vehicle 10 may already be in all-wheel drive (parallel HEV mode) when the trigger condition 424 is satisfied. In some examples, the trigger condition 424 may require activation of all-wheel drive if all-wheel drive is not already active.

If the vehicle 10 was already in all-wheel drive and then the trigger condition 424 is satisfied, the required torque split may be a pre-existing required torque split. Depending on implementation, the trigger condition may modify the value of the pre-existing required torque split or may keep the previous value. Permitted deviation from the required torque split is inhibited as described above. When trigger condition 424 is not satisfied, more deviation from the required torque split may be permitted.

Another example of a low traction trigger condition 424 is wheel slip. For example, block 422 of the method comprises receiving an indication of detected wheel slip. Block 424 may comprise determining whether the trigger condition is satisfied in dependence on the detected wheel slip. The trigger condition may require activation and/or continued operation of the vehicle 10 in all-wheel drive. The trigger condition may remain satisfied until satisfaction of an exit condition associated with the wheel slip no longer being detected. The exit condition may be satisfied as soon as wheel slip is no longer detected or some hysteresis may be incorporated into the exit condition.

Upon satisfaction of the trigger condition, the method proceeds to block 426. Block 426 comprises controlling the determination of the electric machine torque request such that deviation of the second (provided or providable) torque split ratio from the first (required) torque split ratio is inhibited. Block 426 may further require an indication that a deviation exists between the first ratio and the second ratio, otherwise the ratios are matched and block 426 is not required. For example, if an above-threshold shortfall of engine torque is detected or expected relative to the engine torque request, and the trigger condition is satisfied, block 426 is performed.

In an implementation, block 426 uses a constraint which limits torque requestable from the second electric machine 212. The constraint may be based on the required torque split. The constraint may inhibit permitted deviation of the ratio of torques received at the vehicle wheels from the required torque split.

In order to substantially eliminate deviation from the required torque split, block 426 may be implemented by permitting the electric machine torque request to change at a slower rate than the maximum/typical rate of change the electric machine is capable of, the slower rate being based on the rate at which the internal combustion engine is able to change its torque. This prevents the second electric machine 212 from increasing its wheel torque at the second set of vehicle wheels (RL, RR) faster than the engine 202 is capable of increasing wheel torque at the first set of vehicle wheels (FL, FR).

The reduction of the electric machine torque request results in the chain dashed line 510 in FIG. 5B. The reduced electric machine torque request 510 mirrors the provided combustion engine torque 504, including the shortfall. Therefore, the ratio of lines 504:510 substantially matches the originally required ratio 502:508 so that the required torque split is maintained consistently.

In an example implementation of block 426, an engine torque constraint is determined based on the combustion engine torque determined at block 404. Block 426 changes the torque request for the second electric machine 212 to match the engine torque constraint. The engine torque constraint may be a torque limit such as a torque rate limit. The torque rate limit, if exceeded by the rate of change of the electric machine torque request, may limit the rate of change of electric machine torque, to slow down the wheel torque response capability of the second electric machine 212 to match the wheel torque response capability of the engine 202. Therefore, the torque at the front and rear axles of the vehicle 10 increases at a same maximum rate, maintaining the required torque split.

To determine the engine torque constraint, the control system 208 may measure or estimate the combustion torque providable in response to the engine torque request. An estimation may utilize a controller model of the providable torque of the engine 202. A measurement may utilize sensors such as torque sensors. The resulting engine torque constraint may be dependent on, e.g. equal to or correlated with, the providable combustion engine torque.

The magnitude of the engine torque constraint as applied to the second electric machine 212 may depend on a difference between a first gear ratio and a second gear ratio. The first gear ratio is indicative of the total gear reduction between the engine 202 and the first set of vehicle wheels FL, FR. The second gear ratio is indicative of the total gear reduction between the second electric machine 212 and the second set of vehicle wheels RL, RR. The second gear ratio may be different from the first gear ratio. Unlike the second gear ratio, the first gear ratio may depend on a selected gear in the transmission 204. The first gear ratio may depend on a detected or modelled torque multiplication of the torque converter. The gear ratios may depend on wheel (i.e. literally the tyre) radius, for example if the wheels at different axles have different radii. The magnitude of the engine torque constraint (block 426) and/or the shortfall (block 406) may be calculated as wheel torque, which is then converted into an electric machine torque request based on this difference in gear ratios.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 4 may represent steps in a method and/or sections of code in the computer program 306. The illustration of a particular order to the blocks does not necessarily imply that there is a required or preferred order for the blocks and the order and arrangement of the block may be varied. For example, in some examples a determination that a trigger condition has been satisfied (block 424) may be the first step in the method and outputting torque requests (block 402), determining torque providable by the internal combustion engine (Block 404) and determining the shortfall in torque providable relative to the torque request (blocks 406) may be carried out subsequent to a determination that a trigger condition is satisfied.

Furthermore, it may be possible for some steps to be omitted in some examples.

Although embodiments of the present invention have been described in the preceding paragraphs with reference to various examples, it should be appreciated that modifications to the examples given can be made without departing from the scope of the invention as claimed. For example, deviation of the ratios could be reduced simply by inhibiting/cancelling the earlier-mentioned compensation torque function when the trigger condition is satisfied. This is because when a torque source coupled to one axle provides extra torque to compensate for a shortfall of torque at the other axle, the ratio of torques at the respective axles moves away from the required torque split.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling an electric machine of a vehicle, the vehicle comprising an internal combustion engine configured to provide torque to a first axle of the vehicle for generating first axle wheel torque, and the electric machine configured to provide torque to a second axle of the vehicle for generating second axle wheel torque, the control system comprising one or more controllers, wherein the control system is configured to:
output a torque request for the engine and a torque request for the electric machine, the torque requests having a first ratio dependent on a required torque split between the first axle wheel torque and the second axle wheel torque, wherein received first axle wheel torque and received second axle wheel torque have a second variable ratio dependent on a difference between wheel torque response capabilities of the engine and of the electric machine, wherein the received first axle wheel torque is the torque received at one or more wheels of the first axle and the received second axle wheel torque is the torque received at one or more wheels of the second axle;
receive an indication of a shortfall relative to the torque request for the engine, dependent on torque providable by the internal combustion engine, wherein a deviation of the first ratio from the second ratio is dependent on the indication of the shortfall;
determine that a trigger condition is satisfied, wherein the trigger condition is a low traction trigger condition; and
control, when the trigger condition is satisfied, determination of the torque request for the electric machine such that deviation of the second ratio from the first ratio is inhibited.

2. The control system of claim 1, wherein satisfaction of the low traction trigger condition is dependent on a change of terrain for the vehicle, to a terrain associated with a low traction driving surface.

3. The control system of claim 2, wherein the determining a change of terrain comprises determining the characteristics and/or type of surface that the vehicle is currently being driven on.

4. The control system of claim 2, wherein the determining a change of terrain comprises receiving at least one input from a user of the vehicle selecting a terrain mode of the vehicle.

5. The control system of claim 1, wherein satisfaction of the trigger condition is dependent on detection of wheel slip.

6. The control system of claim 1, wherein the torque request for the electric machine and the torque request for the internal combustion engine, are dependent on a vehicle torque request, so that the electric machine provides torque to the second axle while the internal combustion engine provides torque to the first axle.

7. The control system of claim 1, wherein the required torque split is dependent on at least one of: vehicle speed; vehicle steering; lateral acceleration; or longitudinal acceleration.

8. The control system of claim 1, wherein the inhibited deviation is controlled using a constraint limiting torque requestable from the electric machine.

9. The control system of claim 1, wherein the inhibited deviation control is configured to reduce the torque request for the electric machine, so that the electric machine is permitted to change its provided torque at a slower rate than the electric machine is capable of, based on a rate at which the internal combustion engine changes its torque.

10. The control system of claim 9, wherein the reducing of the torque request for the electric machine is dependent on an engine torque constraint dependent on detected or estimated combustion engine torque, wherein the combustion engine torque is dependent on torque providable by the engine in response to the torque request for the engine.

11. The control system of claim 1, configured to:
control the determination of the torque request for the electric machine to cause the electric machine to provide compensation torque to the second axle, wherein the compensation torque is configured to compensate for the shortfall but causes the second variable ratio to deviate from the first ratio,
wherein when the trigger condition is satisfied, the inhibited deviation control inhibits the provision of the compensation torque to the second axle, such that deviation of the second ratio from the first ratio is inhibited.

12. A system comprising the control system of claim 1, the electric machine and the internal combustion engine.

13. A vehicle comprising the system of claim 12.

14. A method of controlling an electric machine of a vehicle, the vehicle comprising an internal combustion engine configured to provide torque to a first axle of the vehicle for generating first axle wheel torque, and the electric machine configured to provide torque to a second axle of the vehicle for generating second axle wheel torque, the method comprising:
outputting a torque request for the engine and a torque request for the electric machine, the torque requests having a first ratio dependent on a required torque split between the first axle wheel torque and the second axle wheel torque, wherein received first axle wheel torque and received second axle wheel torque have a second variable ratio dependent on a difference between wheel torque response capabilities of the engine and of the electric machine, wherein the received first axle wheel torque is the torque received at one or more wheels of the first axle and the received second axle wheel torque is the torque received at one or more wheels of the second axle;
receiving an indication of a shortfall relative to the torque request for the engine, dependent on torque providable by the internal combustion engine, wherein a deviation of the first ratio from the second ratio is dependent on the indication of the shortfall;
determining that a trigger condition is satisfied, wherein the trigger condition is a low traction trigger condition; and
controlling, when the trigger condition is satisfied, determination of the torque request for the electric machine such that deviation of the second from the first ratio is inhibited.

15. A non-transitory, computer-readable medium having stored thereon computer software that, when executed, is arranged to perform a method according to claim 14.

16. The control system of claim 2, wherein in response to the determination of a change of terrain for the vehicle, the inhibited deviation control is maintained until a subsequent determination of a change of terrain for the vehicle, to a terrain not associated with a low traction driving surface.

17. The control system of claim 5, wherein in response to the detection of wheel slip, the control is maintained until satisfaction of an exit condition associated with the wheel slip no longer being detected.

18. A vehicle according to claim 13, wherein the vehicle is configured to mechanically provide torque from the internal combustion engine to the first axle and from the first electric machine to the second axle, but is not capable of mechanically providing torque from the internal combustion engine to the second axle and is not capable of mechanically providing torque from the first electric machine to the first axle.

* * * * *